United States Patent [19]
Pieterse

[11] Patent Number: 6,088,127
[45] Date of Patent: Jul. 11, 2000

[54] DEVICE AND METHOD FOR FORWARDING ELECTRONIC MESSAGES

[75] Inventor: Rob Pieterse, Aerdenhout, Netherlands

[73] Assignee: Kininklijke KPM N.V., Netherlands

[21] Appl. No.: 08/833,941

[22] Filed: Apr. 14, 1997

[30] Foreign Application Priority Data

Apr. 15, 1996 [NL] Netherlands ............................ 1002869

[51] Int. Cl.$^7$ ................................................. H04N 1/00
[52] U.S. Cl. ...................... 358/407; 379/100.09; 370/389
[58] Field of Search .................... 358/434, 468, 358/402, 403, 407, 440; 379/100.01, 100.07, 100.08, 100.09; 370/389, 428, 429

[56] References Cited

U.S. PATENT DOCUMENTS

| | | | |
|---|---|---|---|
| 5,404,231 | 4/1995 | Bloomfield | 358/400 |
| 5,465,167 | 11/1995 | Cooper et al. | 358/468 |
| 5,712,907 | 1/1998 | Wegner et al. | 379/112 |
| 5,757,510 | 5/1998 | Okada | 358/402 |
| 5,905,782 | 5/1999 | Lee et al. | 379/100.01 |

FOREIGN PATENT DOCUMENTS

| | | | |
|---|---|---|---|
| 0360732 | 3/1990 | European Pat. Off. | H04N 1/32 |
| 0596724 | 5/1994 | European Pat. Off. | H04N 1/32 |
| 9501040 | 6/1994 | WIPO | H04M 11/00 |
| 95/01040 | 1/1995 | WIPO | H04M 11/00 |

*Primary Examiner*—Andrew W. Johns
*Attorney, Agent, or Firm*—Bachman & LaPointe, P.C.

[57] ABSTRACT

Device for receiving and forwarding fax messages with control information and other information, which control information comprises destination address information and a transmission priority code, and which device is provided with:

a memory decoding means connected to the memory for receiving the fax messages and for decoding the control information and for storing, for each fax message, the decoded control information together with the other information in the memory;

fax forwarding means connected to the memory for reading, for each fax message, the decoded control information together with the other information out of the memory and for forwarding at least the other information of the fax message, a communication link being automatically selected on the basis of the transmission priority code and the instant in time of forwarding being determined within a time interval determined by the transmission priority code.

28 Claims, 2 Drawing Sheets

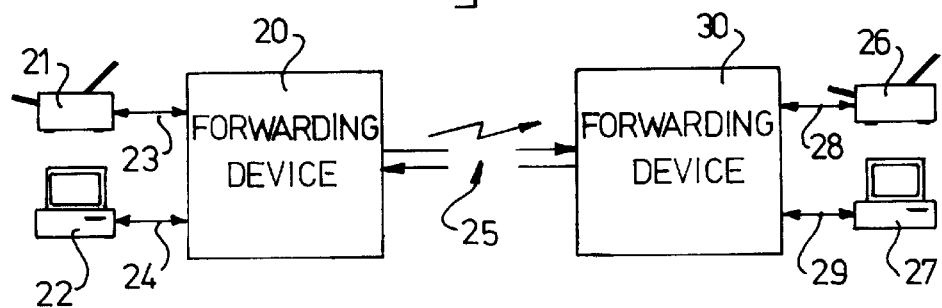
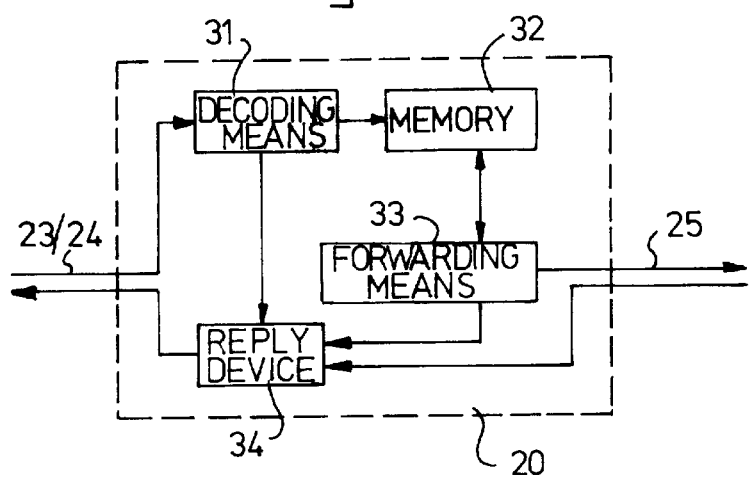
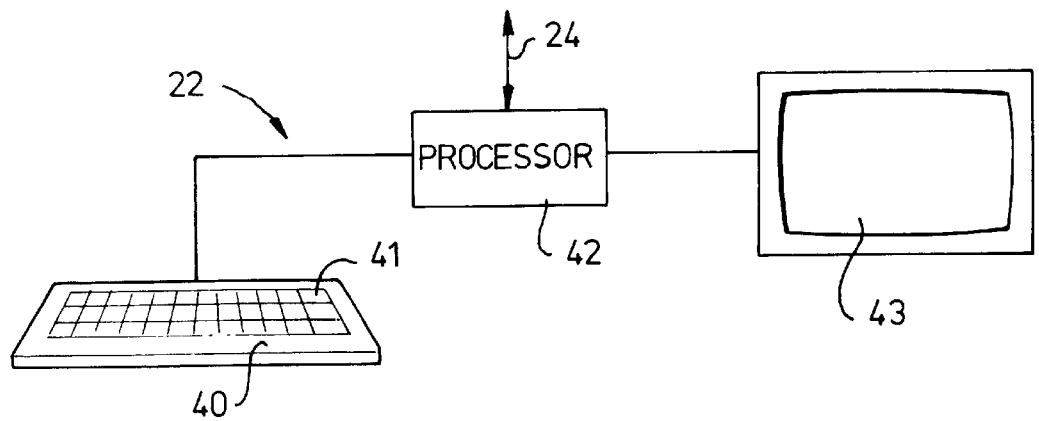

Fig-3

| | |
|---|---|
| Kon. PTT Ned. The Hague | |
| Transmitting client code : | ☐☐☐☐☐☐ |
| Serial number code : | ☐☐☐☐☐☐ |
| Sent by Fax Factory® ; | The Netherlands |
| Addresse 1 : fax nr. : name : address : Transmission priority : | ☐☐☐☐☐☐☐☐☐☐☐☐☐ ☐ |
| Addresse 2 : fax nr. : name : address : Transmission priority : | ☐☐☐☐☐☐☐☐☐☐☐☐☐ ☐ |
| ⋮ | |
| Acknowledge receipt ? : | ☐ |
| Number of pages : | ☐ ☐ |
| Transmission quality : | ☐ |
| Way of delivery : | ☐ |
| Standard front page ? : | ☐ |

DEVICE AND METHOD FOR FORWARDING ELECTRONIC MESSAGES

BACKGROUND OF THE INVENTION

The present invention relates to a device for receiving and forwarding electronic messages which each comprise at least a section containing coded control information and other information, which control information comprises at least one group of destination address information and which device is provided with;

a memory;

decoding means connected to the memory for receiving the electronic messages and for decoding the coded control information and for storing, for each electronic message, the decoded control information together with the other information in the memory;

forwarding means connected to the memory for reading, for each electronic message, the decoded control information together with the other information out of the memory and for forwarding at least the said other information of the electronic message via a communication link selected on the basis of at least the one group of destination address information, after a time interval to be controlled automatically by the forwarding means.

Such a device is disclosed in European Patent Application EP-A-0,360,732. In the European patent application, such a device is referred to as a "store and forward facility" (SAFF). Such devices are disposed between a transmitting fax machine and a receiving fax machine. Transmitting fax machines transmit their fax messages to such a device, after which the device stores the fax messages received in a memory. The device then determines the various communication links via which the various fax messages must be sent to receiving fax machines. The receivers of the transmitted fax messages can also themselves be in turn similar devices which are disposed centrally and are coupled to various fax machines and are equipped to distribute the received fax messages to the various receiving fax machines. The advantage of such devices between transmitting machines and receiving fax machines is primarily that the transmitting fax machines no longer often occupy in vain, for example, long-distance links at instants when the receiving fax machine is not capable of receiving a fax message, for example because it is already receiving another fax message from another transmitting fax machine at that instant. Because the devices between the transmitting and receiving fax machines are provided with memories for storing various fax messages, international communication links, in particular, only have to be occupied once for transmitting international fax messages. The risk that a receiving fax-machine is not capable of receiving a fax message is then manifested only by means of the various number of times an attempt is made to make contact via a local communication link, which is cheaper than an international communication link. In this way, more efficient use is made of telecommunication links.

Of the known device for receiving and forwarding fax messages, it is reported that it is capable of waiting until a suitable communication link is available before the fax message is forwarded.

Of the known device, it is furthermore reported that it is possible for a user to make contact with it via a telephone line in order to give a priority to a particular fax message. The transmitting device for forwarding the respective fax message will then assign a priority level to the respective fax message and communicate this to the receiving device in order to forward fax messages to the other end of the chosen communication link. The consequence of this is that the receiving device for forwarding fax messages will give the respective fax message a higher priority than the messages already waiting for a particular destination address. The communication of such a priority of a fax message neither has consequences for the choice of the type of communication link (which can be differentiated, for example, as regards cost and quality) between the two devices for forwarding fax messages, nor for the time interval in which fax messages are forwarded from the one device to the other.

SUMMARY OF THE INVENTION

The object of the present invention is to provide means with which a still move efficient use is achieved, in particular, of long-distance links for transmitting electronic messages. In this context, electronic messages comprise both fax messages after they have been read into a fax machine and messages within the context of electronic mail.

To achieve the object, a device of the above-mentioned type has the characteristic that it is equipped to receive a transmission priority code added to each item of destination address information and, during operation, the forwarding means automatically select the communication link at least on the basis or the transmission priority code from a multiplicity of communication links and determine the instant in time of forwarding the electronic message, the instant in time being within a maximum time interval determined by the transmission priority code.

The contents of such a transmission priority code can be determined by the user of the transmitting machine. The transmission priority code may be chosen, for example, from three options: low, normal, high. Other options are also possible. It a high transmission priority is required, the forwarding means will select a telecommunication link as quickly as possible, virtually no attention being paid to the cost of occupying such a communication link. If a normal transmission priority code is provided, the forwarding means will select a communication link at a normal tariff. If the user specifies a low transmission priority, the forwarding means will bring about as cheap a communication for example within a predetermined time interval. Specifying a transmission priority code therefore results in the occupation of a cheaper or more expensive communication link, which can be revealed to the sender of the electronic message in the invoice. Electronic messages which have a low priority for the sender can be stored by the forwarding means until cheap communication links are available. This will result in a more efficient use, in particular, of international communication links. Senders of electronic messages in Europe may, for example, specify with the aid of the transmission priority code that electronic messages intended for destination addresses in the United States do not have to be transmitted before the start of the working day in the United States. The forwarding means will then delay forwarding such electronic messages until the working day has started in the United States or later, which will result in a more efficient occupation of intercontinental telecommunication links between Europe and the United States.

In the device according to the invention the forwarding means therefore make use of a routing algorithm for selecting the forwarding route of the electronic message. In this context, the device may make use of various available, "dissimilar" networks each having its own characteristic cost and speed properties. The routing algorithm also determines the choice on the basis of the transmission priority code.

In another embodiment, the device according to the invention had the characteristic that it is further equipped to receive a transmitting client code assigned to a predetermined client and, during operation, the device automatically draws up an itemized invoice for the client associated with the transmitting client code. Transmitting a transmitting client code at the same time provides, for example, the possibility of drawing up an invoice for someone other than the sender of the electronic message in accordance with agreements previously made.

As an alternative, or in addition thereto, the device can automatically determine, on the basis of the transmitting client code, a reply telephone number assigned to the client for automatically providing reply messages. Such reply messages may, for example, relate to error messages, and also to a refusal to forward an electronic message.

Such a transmitting client code can either be entered by the sender on a fax cover sheet or be printed as standard for the respective client on its fax cover sheet. It is also conceivable that a transmitting client code is specified in some other way on the fax cover sheet for the respective sender.

If, for example, the invoice is drawn up as a function of the transmitting client code, the sender will be interested in countermeasures against theft of fax cover sheets provided with such a transmitting client code. To provide such security, a device according to the invention has, for example, the characteristic that it is further equipped to receive the telephone number of a transmitting machine, and, during operation, the device checks whether the telephone number corresponds to the transmitting client code and, is this is not the case, does not forward the electronic message received. With such a measure, the electronic messages can be transmitted only from a predetermined machine, whose telephone number corresponds to the transmitting client code. The use of fax cover sheets on another transmitting machine has the result that forwarding of the respective electronic message is refused.

In the above-mentioned case, it is, however, still possible for fraud to be perpetrated by those who transmit fax messages with a particular fax cover sheet from the associated transmitting machine without being authorized to do so. This problem is solved in a subsequent embodiment of the invention in which the device is further equipped to receive a personal identification number (PIN) and, during operation, the device checks whether the transmitting client code corresponds to the personal identification number and, if this is not the case, does not forward the electronic message received. In that case, theft of fax cover sheets no longer has any point because a thief will generally not know the personal identification number associated with the fax cover sheet. Such a personal identification number can, for example, be rendered recognizable for the device in that, after keying in the telephone number of the device for making a communication link between the device and the transmitting machine, the user keys in the personal identification number at the same time.

As an alternative, or in addition thereto, the device can also be equipped to receive a serial number code, the device checking, during operation, whether the electronic message associated with the serial number code can be forwarded and, it this is not the case, blocking its forwarding thereof. Such a serial number code may originate, for example, from a fax cover sheet, the serial number code identifying the fax cover sheet in an unambiguous and unique way. Use of stolen fax cover sheets can therefore be blocked by reporting their serial number codes to the operator of the device.

A further improvement in the cost-effective use, in particular, of long-distance communication links is achieved in a further embodiment in which the device is further equipped to receive a transmission quality code and, during operation, the forwarding means forward at least the other information with a quality determined by the transmission quality code. If a user is not interested, for example, in the delivery of an electronic message with the best possible quality, he provides his electronic message with a transmission quality code which indicates a low transmission quality. The forwarding means will then determine a way of transmitting the electronic message which possibly provides a lower quality of the electronic message delivered. For this purpose, a communication link can generally be made which guarantees a lower quality, but is therefore in fact cheaper. Such lower costs can be passed on to the client so that the latter also has an advantage therefrom.

In a further embodiment, the device has the characteristic that it is further equipped to receive a way-of-delivery code selected from one of the following options:

a "direct way-of-delivery code" which controls the forwarding means so as to forward at least the other information directly to a receiving machine associated with the destination address information;

a "central way-of-delivery code" which controls the forwarding means so as to forward at least the other information to a central distributing device for distributing electronic messages to receiving machines disposed in its vicinity, which central distributing device is selected by the forwarding means on the basis of the distance from the address associated with the destination address information;

a "postal way-of-delivery code" which controls the forwarding means so as to forward at least the other information, optionally via a central distributing device, to a receiving machine of a post office which is selected by the forwarding means on the basis of the distance from the address associated with the destination address information.

Such a way-of-delivery code can be entered, for example, by the user on the fax cover sheet of a fax message. Other way-of-delivery codes are conceivable.

In some cases, the sender will not wish, for example, for the receiver of the transmitted electronic message to receive a copy of the cover sheet he has filled in. That will be the case, for example, if the sender has indicated on the cover sheet more than one addressee and he does not wish the various addressees to be mutually aware that they have received a copy of the electronic message. This can easily be solved in a further embodiment of the device which has the characteristic that the device is further equipped to receive a cover sheet layout code and, during operation, the forwarding means forward at least the other information provided with cover sheet information, the forwarding means determining the contents of the cover sheet information as a function of the cover sheet layout code. After receiving such a cover sheet layout code, the forwarding means themselves will compose, in accordance with predetermined instructions, as if it were a new cover sheet which is forwarded together with the other information or the electronic message. In composing a new cover sheet, particular data can then be omitted or, on the contrary, be added.

In a preferred embodiment of the device according to the invention, it has the characteristic that the decoding means comprise "optical character recognition" (OCR) means. Such optical character recognition means can be used with advantage if the user applies on his own account, for example with ball pen, the above-mentioned various codes to the fax cover sheet. Such optical character recognition means can then decode the codes created by the user himself, the contents of which codes controlling the forwarding of the electronic message. The advantage is furthermore that existing fax machines do not then have to be further adapted for the invention. The codes are then provided via their reproduction on the fax cover sheet, which is read in and transmitted in the normal standard way by a transmitting machine.

In a further embodiment, the device has the characteristic that, during operation, the forwarding means arrange various electronic messages in groups selected on the basis of their destination address information and their transmission priority code and forward the groups of electronic messages automatically in the form of linked blocks. Generally, the destination address information of the various electronic messages will comprise telephone numbers of receiving machines. Since a device according to the invention may have many electronic messages in its memory at a particular instant, it may be equipped to form groups of electronic messages whose destination telephone numbers specify that they have to be delivered in the same country or in the same place. The groups can then be transmitted simultaneously over a section of the communication link if the device has seized a suitable communication link for an acceptable tariff. This may mean, for example, that for ten different electronic messages, an intercontinental link has to be seized only once, which results in greater efficiency of the telecommunication network.

In a further embodiment, the forwarding means can automatically select the communication link from, for example, one of the following possible communication links: a telephone link, an ISDN link, an electronic-mail link and any desired combination thereof.

A further object of the present invention is to provide a fax cover shoat whereby devices of the above-mentioned type can seize (international) communication links in a more efficient way. The invention therefore also provides a fax cover sheet for interacting with a device as defined above, which fax cover sheet is provided with a group comprising at least one group of electronically recognizable destination address markers and a group comprising at least one electronically recognizable transmission priority marker, one for each group of destination address markers, each group of destination address markers identifying a destination address and each transmission priority marker identifying a transmission priority to the respective destination address. Such a transmission priority marker is applied to the fax cover sheet by the sender himself. The transmission priority marker may be chosen, for example, in accordance with low, normal or high priority for the delivery of the respective electronic message at the addressee, as has been explained above.

In a further embodiment, the fax cover sheet is also provided with electronically recognizable transmitting client markers for identifying a transmitting client. As has already been noted above, such transmitting client markers can be used by the device for forwarding electronic messages, for drawing up invoices and for specifying a reply telephone number, for example for providing error messages. The transmitting client markers may, for example, be applied beforehand.

The fax cover sheet may further be provided with, respectively, an electronically recognizable transmission quality marker, way-of-delivery marker and/or cover sheet layout marker. These markers correspond respectively to the above-mentioned transmission quality code, the way-of-delivery code and the cover sheet layout code.

The present invention finds application not only in situations in which originals are read out in the form of paper by a transmitting fax machine and sent to the device for forwarding electronic messages. Instead thereof, the main idea of the invention can also be applied in cases where the message to be transmitted is contained in a computer memory. In practice, the electronic message then relates to electronic mail.

The present invention therefore also relates to a computer device provided with input means, display means and a processor which is connected both to the input means and the display and can be connected to an input/output link for transmitting and receiving data, the processor being provided with means for:

receiving messages which are fed in via the input means and which comprise at least control information and other information, which control information comprises at least one group of destination address information and furthermore at least one transmission priority code associated with each group of destination address information for specifying the priority with which the message has to be transmitted, and laying out at least one electronic cover sheet and displaying it on the display means, which at least one electronic cover sheet comprises at least one section of the control information.

In further embodiments, the computer is equipped with means for laying out the electronic cover sheet and displaying it on the display means, in which process the various above-mentioned codes are generated. The codes can be fed in, for example, by a user via a keyboard.

The invention also relates to methods for receiving and forwarding electronic messages. The present invention can also be embodied in suitable software packages.

BRIEF DESCRIPTION OF THE DRAWINGS

The invention will be explained in greater detail below by reference to some drawings, which are intended only to illustrate the invention and not to restrict it.

FIG. 1 diagrammatically shows, partially as a block diagram, two devices for forwarding electronic messages generated either with the aid of a fax machine or with the aid of a (personal) computer;

FIG. 2 shows, in a block diagram, a number of elements of a device for forwarding electronic messages;

FIG. 3 diagrammatically shows a possible layout of a fax cover sheet which can be used in the device according to the invention;

FIG. 4 shows a computer arrangement for generating an electronic cover sheet in accordance with the present invention.

DETAILED DESCRIPTION OF THE EMBODIMENTS

FIG. 1 shows a device 20 for forwarding electronic messages which is connected via a communication link 23 to a fax machine 21. In practice, the device 20 will be connected to a plurality of fax machines, but only one is shown for the sake of clarity.

Via a further communication link 24, the device 20 is connected to a computer device 22, which may be a personal computer. The device 20 may be connected to a plurality of computers, but only one is shown for the sake of clarity.

The communication links 23 and 24 will generally be short-distance links via which telecommunication links can be seized for a local or national tariff.

Via a communication link 25, the device 20 call forward electronic messages and receive them from a further fax machine 26. In general this will take place as a result of the intervention of a second device 30 for forwarding electronic messages. The device 30 for forwarding electronic messages may be identical to device 20. Device 30 is connected to the fax machine 26 via a communication link 28.

The device 30 can be connected via a communication link 29 to a computer device 27, which may be a personal computer.

Generally, the communication links 28, 29 will be short-distance links, just like the communication links 23, 24. On the other hand, the communication link 25 between the devices 20 and 30 will generally be a long-distance link, for example an intercontinental communication link between Europe and the United States.

FIG. 2 shows a possible structure of the device 20. Device 30 may be constructed in the same way.

Device 20 comprises decoding means 31, for example OCR (=optical character recognition) means. The decoding means 31 are provided with an input which can be coupled to communication links 23, 24. The decoding means 31 are provided with a first output, which is connected to an input of memory 32, and a second output, which is connected to a reply device 34.

The memory 32 is connected, for example via a bidirectional link, to forwarding means 33. It is pointed out that the term "memory" should be interpreted broadly. Sometimes it may be functionally, for example, a transfer gateway, for example if conversion is carried out only from a POTS telephone line to an ISDN line.

Forwarding means 33 have a first output, which can be coupled to the communication link 25, and a second output which is coupled to the reply device 34.

Reply device 34 has a further input which can be coupled to the communication link 25. The reply device 34 is also provided with an output which can be coupled to the communication links 23, 24.

It is pointed out that the structure shown in FIG. 2 relates only to an example. The organization of device 20 does not need to be constructed, for example, with the aid of physically separate elements. The various elements can also be designed in the form of a computer, for example in the form of a suitable software package. Only the various functions which can be performed jointly by the elements are of importance. The functions will be explained later in the description.

FIG. 3 shows a layout of a fax cover sheet which can advantageously be used in a device according to the present invention. The fax cover sheet 1 contains a flag 18, which is applied, for example, in the left-hand top corner. The flag 18 can be used for various purposes. First of all, the flag 18 can be used for correctly positioning the fax cover sheet 1 with respect to the fax machine 21. Secondly, the flag 18 can be used as reference point for other codes which are provided on the fax cover sheet 1 and which will be further discussed below.

The fax cover sheet 1 is further provided with the sender's letter head 2, which may be specified in code, for example in the form of a preprinted bar code.

Under the letter head 2, there is a space 3 in which a transmitting client number can be incorporated. The transmitting client number can be provided in boxes 3($i$), where i is 1, 2, . . . , I, specially preprinted for the purpose. The code in the boxes 3($i$) identify the sender unambiguously and may be preprinted. On the other hand, fax cover sheets 1 may also be provided in such a way that the boxes 3($i$) are originally blank and have to be entered by the sender himself.

Underneath box 3 there is a box 4 in which a serial number code 4(1) . . . , 4(N) is preprinted. The code preprinted therein is unique and is associated with only a single fax cover sheet. Such unique codes can be unambiguously and reliably identified by modern means and cryptographic methods. They can be used to combat fraud. This device 20 may, for example, be equipped to compare a received serial number code 4($n$) with a received transmitting client code 3($i$). If a previously specified relationship is not detected, the forwarding of the fax message is refused. Provision may also be made that fax cover sheets which have been used once (and therefore used serial numbers) cannot be used again so that theft of used fax cover sheets is pointless. A client may also have use of fax cover sheets blocked if they have been stolen. He must then, of course, report the serial numbers of the stolen fax cover sheets to the operator of the device 20.

The space 5 shows a message "Sent by Fax Factory", "The Netherlands" which indicates that the fax cover sheet 1 is being used to transmit fax messages via the device 20 for forwarding electronic messages.

Underneath space 5, the fax cover sheet 1 has various spaces 6($j$), where j=1, 2, . . . , J, for receiving one or more addresses of the fax message. For each addressee, a sender can incorporate the fax number of the addressee j in boxes 7($j$) specially intended for the purpose. There is furthermore space for filling in the name of the addressee and the address.

Each box 6($j$) comprises at least one box 8($j$) for showing the transmission priority. The transmission priority should be entered by the sender himself. For each addressee j, the sender can fill in a different transmission priority 8($n$). Such a transmission priority can be chosen, for example, from three options: low, normal, high. If the sender specifies a low priority, for example having a code L, this means that the respective addressee j does not have per so to receive the respective fax message immediately but, as far as the sender is concerned, several hours may elapse before addressee j receives the respective fax message. The specification of a low priority will correspond to lower costs for transmitting the fax to addressee 1. This will also be explained in more detail below.

Another addressee, for example addressee j+1 is assigned, for example, a normal priority, for example specified by N. This means that addressee j+1 must receive the respective fax message within a normal time interval. This will generally be coupled to a normal tariff for transmitting the fax message.

If, on the other hand, the sender specifies in one of the boxes 8(j+2) that a high transmission priority, for example specified by H, is desired, this means that the respective fax message must be transmitted as speedily as possible to the respective addressee j+2. In general, the fax transmission will then be accompanied by the highest costs for the sender.

Instead of specifying the transmission priority with the aid of three codes, that is to say low, normal and high, other codes can be used for the transmission priority 8($j$). Thus, it is also possible that the user fills in a numeral 1, 2, 3, . . . , in each of the boxes 8($j$). If a user enters, for example, "4" in box 8($j$), this means that the respective addressee j should receive the respective fax message within four hours. The system then acquires the flexibility of finding within these four hours the most simple, that is to say generally the cheapest, communication route for transmitting the respective fax message. It will generally be possible for the costs passed onto the sender to be lower it the sender makes a greater number of hours available for forwarding the respective fax message.

It is furthermore conceivable that a distinction is only made between night and day tariffs.

It is also possible for a user to leave a box 8(j) blank, which will be interpreted by the device 20 as a "default" value, indicating for example, a normal transmission priority.

On the basis of a routing algorithm, the device 20 determines the most appropriate route as regards costs and quality within the maximum time interval determined by the transmission priority code 8(j).

Underneath the space 6(j) for specifying the addresses, there is a space 9 for showing a receipt acknowledgement. For this purpose, the sender can specify in box 10 by means of a code whether he wishes to receive acknowledgement of the receipt of the respective fax message.

Underneath space 9 there is a space 11 containing boxes 11(1), 11(2) for showing the number of pages transmitted. Although two boxes are shown, more boxes can, of course, be provided. The boxes 11(1), 11(2) must be entered by the sender. The number of pages transmitted entered by the sender may possibly be used by the device 20 to check whether all the pages have been read in and are contained in the device 20 for forwarding at a suitable instant. If this is not the case, the device 20 may possibly issue an error message.

In space 12, the sender can specify the transmission quality in box 13 with the aid of a code. For this purpose, the user may choose, for example, a low, normal or high transmission quality. The lower the desired transmission quality, the lower can be the costs charged to the sender. A lower transmission quality generally means a lower degree of occupation of communication links so that the provision of this option makes possible a further increase in the cost-effective use of communication links. After all, the lower the desired transmission quality, the more space will be left on communication links for other electronic messages.

In space 14, the possibility is provided, via a box 15, for the sender to determine the way of delivery or the respective fax message. The sender can, for example, choose three different forms of delivery: direct delivery of the fax message via the addressee's fax machine 26, delivery via the addressee's computer 27 or delivery via the nearest post office to the addressee, possibly registered or by express. If the sender wishes to make use of this last possibility, he must, for example, enter, for the respective addressee, not the fax number of the addressee j in the respective boxes 7(j), but his telephone number. The device 30, which is equipped to distribute received fax messages to various fax machines 26 and the computers 27, then automatically detects the fact that the specified fax number does not correspond to a fax machine, but to a telephone number. The device 30 can then use this information to establish the fax number of the nearest post office. The device 30 then sends the respective fax message to the respective post office with the message that the respective fax message must then be delivered to the addressee j via the normal postal channels. Of course, additional costs will be charged for this. Other forms of delivery procedures are conceivable. For example, that the device 30 stores the respective fax message in its own memory and waits until the addressee j signals that the respective fax message can be transmitted to his fax machine 26.

Finally, underneath space 14 is a space 16 containing a box 17. The sender can indicate in box 17 whether he wishes to forward the fax cover sheet 1 as shown in FIG. 3 to all the addressees or if he wishes the device 20 to lay out a standard fax cover sheet for every addressee. The device 20 can then be programmed so that, if it lays out a standard fax cover sheet, the data of the other addresses are omitted. An addressee does not then know the other addressees who have also received the respective fax message, which may sometimes be advantageous.

The distance from each of the boxes 3(i), 7(j), 8(j), 10, 11(1), 11(2), 13, 15, 17 from the flag 18 is predefined. If a fax machine 21 reads out the respective fax cover sheet, this means that the stream of information which is transmitted via communication link 23 to the device 20 contains information from the boxes which are disposed at the time at a predetermined distance with respect to the flag 18. The device 20 therefore knows which information corresponds to the codes entered in the respective boxes by the sender.

As an alternative, each of the boxes 3(i), 7(j), 8(j), 10, 11(1), 11(2), 13, 15 and 17 is provided with an OCR identification code which uniquely identifies each of the boxes. Detection of the distance from the flag 4 is then no longer necessary.

Although it has been disclosed above that the boxes 9, 12, 14 and 16 occur only once, it is possible to include such boxes for each addressee.

The device according to FIGS. 1 and 2 operates, for example, at follows. The decoding means 31 receive the fax message as read in by the fax machine 21. The decoding means first of all receive the fax cover sheet 1 converted into electrical signals. In one embodiment, provision is made that the sender fills in the various boxes 3(i) . . . 17 with the aid of characters. In that case, the decoding means 31 comprise OCR means for recognizing the characters. It is, however, also conceivable that, for example, a client number 3 is preprinted in the form of a bar code on the fax cover shoot 1 belonging to the respective client. In that case, the decoding means 31 must also comprise means for analysing bar codes.

The decoding means 31 decode the information from the boxes 3(i), 4(n), 7(j), 8(j), 10, 11(1), 11(2), 13, 15 and 17. The contents of the code deposited therein is the check and control information for the device 20. After decoding it, the control information is stored, together with the remainder of the fax message, in the memory 32. The memory 32 is of a capacity such that a large quantity of fax messages can be stored therein. The decoding means 31 may be equipped in such a way that they are capable of simultaneously maintaining various links to various fax machines and of storing simultaneously the various fax messages sent by them in the memory 32. This prevents a communication link to the decoding means 31 having a high risk of being busy.

The forwarding means 33 read out the memory 32 and determine the transmission priority, as shown by means of the boxes 8(j), for each addressee of each fax message. In devices 20 according to the prior art, the forwarding means 33 select the communication link 25 in accordance with the fax number 7(j) specified by the sender for each addressee j. The instant in time of transmission of the respective fax message can be delayed in a device 20 according to the prior art until a suitable communication link 25 is available. In accordance with the present invention, the forwarding means 33 automatically determine, during operation, both the communication link and the instant in time of forwarding the respective fax message on the basis of the respective transmission priority 6(j) as entered by the sender for addressee j. In the system according to the invention, the sender thus has the option of influencing the forwarding of the respective fax message. For this purpose, the sander provides the control information by means of the box 8(j).

If, fox example, a sender has specified a low transmission priority for addressee j by means of the respective box 8(j), this is translated, for example by the forwarding means 33, into a control instruction which corresponds to the necessity of transmitting the respective fax message to the respective addressee j within a predetermined time interval, for example ten hours. The forwarding means 33 then determine within the ten hours when the respective fax message can be transmitted most cheaply to addressee j. This gives the forwarding means a time of ten hours to select a suitable communication link 25 from various available communication links which differ in costs and quality. This gives the forwarding means 33 the option of distributing the forwarding of fax messages efficiently with respect to time. This means a more efficient use of the communication link 25. As a result, the need to expand communication links 25 will be felt less quickly.

If, on the other hand, a sender has entered a high priority in box 8(j) of addressee (j), this is translated by the forwarding means 33 into the instruction to forward the respective fax message as speedily as possible, regardless of the costs necessary therefor. This may mean that the forwarding means 33 forward the respective fax message via a very expensive communication link 25, for example of the ISDN network, to addressee j.

If a sender specifies in a box 8(j) that the fax message in question has to be transmitted with a normal transmission priority, this is, for example interpreted by the forwarding means 33 as an instruction to forward the respective fax message within, for example, one hour to addressee j.

Since very reliable OCR means are currently obtainable on the market, existing fax machines 21 do not have to be altered for the system according to the invention. A sender can simply indicate with ball pen or other means the desired transmission priority in the boxes 8(j), and this can be analyzed by the OCR means in the device 20 itself. To implement the invention, therefore, only modifications are necessary in the device 20.

If the forwarding means 33 detect an error in any way, for example that the number of pages specified in space 11 does not correspond to the number of pages stored in the memory 32, the forwarding means 33 emit an error message to reply device 34. On the basis thereof, the reply device 34 assembles an error message for the respective sender. The reply device 34 transmits the error message, for example, via the communication link 23 to which fax machine 21 is connected so that the error message appears in the form of a fax message on fax machine 21. It is also conceivable that the reply device 34 determines a telephone number or the sender on the basis of the client number entered in box 3(i) and makes contact to this telephone set. With the aid of automatic speech messages, an error message can be forwarded via such a telephone set.

Errors may also occur even at an earlier stage. The sender may, for example, forget to enter his client number in the boxes 3(i). In that case, this may already be detected, for example, by the decoding means 31. The decoding means 31 then transmit an error signal to the reply device 34, which again assembles a reply message for the sender on the basis thereof.

FIG. 2 indicates that the reply device 34 also has an input which is connected to communication link 25. This diagrammatically indicates that fax messages which have been transmitted by other fax machines 26 are collected by the reply device 34 and forwarded in a suitable way to fax machine 21. It is pointed out that fax messages can also be received via communication link 25 and be forwarded via communication link 23 by separate means within the device 20. These are not shown in further detail because they are not essential to the present invention.

The device 20 can use the client number, entered by the client or preprinted, in the boxes 3(i) to draw up an itemized invoice for the respective sender. The invoice can then be sent, for example, to a prearranged address other than the address of the sender specified in space 2 on the fax cover sheet 1.

The forwarding means may use the transmission quality specified in box 13 to reduce the information density to be forwarded. If, for example, a sender only specifies a low quality, the forwarding means 33 can compress the respective fax message into information which is such that less space will be necessary on the communication link 25 than for a fax message which has to be forwarded with high quality. In this context, use can be made of any known form of data compression, both for analog and digital data transmission. Depending on the desired transmission quality, the forwarding means 33 can, for example, also choose from the following possible communication links; a normal telephone link, an ISDN link, an electronic-mail link or a combination thereof.

Instead of one box 13 for each fax cover sheet 1, a transmission quality code can also be stated as an alternative in each box 6(j) so that the transmission quality can be controlled for each addressee.

The forwarding means deduce the desired way of delivery from the code entered by a sender in box 15. A sender may, for example, choose from three different ways of delivery, either directly to fax machine 26, or indirectly via the device 30, which first collects various fax messages before forwarding them or via the nearest post office. This has already been explained above.

The forwarding means 33 will translate the code shown in box 17 into an instruction for optionally laying out a fax cover sheet automatically for the respective sender. In this context, various sections of the information on the fax cover sheet 1 can be omitted, in accordance with agreements previously made with the sender. This also provides the option that the sender is shown in space 2 only in the form of, for example, a bar code, which can then be translated by the forwarding deans 33 into an alphanumerical display.

In the embodiment in which the device 20 is constructed in such a way that, on the basis of the client number as shown in boxes 3(i) and associated serial number codes 4(u) as a check, it draws up itemized invoices for the sender and the invoice address is derived from the specified client number, fax cover sheets 1 having preprinted client numbers are valuable. In that case, it is desirable to provide a protection against theft of such fax cover sheets. Such a protection may, for example, be that the device 20 is equipped to compare the client number with the telephone number of the fax machine 21 which transmits the respective fax message. It may be possible, for example, for a fixed relationship to have to exist between the client number and the fax machine 21. If the fixed relationship is not detected by the device 20, the device 20 decides not to forward the respective fax message. This can be revealed to the transmitting fax machine 21 by the reply device 34. This does not, however, completely eliminate fraud because an unauthorized person can then still transmit a fax message using the respective fax machine 21.

A further reduction in possible fraud is provided if a personal identification number (PIN) has to be provided by the sender. This can be done, for example, by the sender feeding in his PIN after feeding in the telephone number or the device 20 to make the communication link 23. For such an embodiment, no changes are necessary to existing fax machines if the PIN is checked in device 20. As an alternative, existing fax machines can also be adapted in such a way that they can read out magnetic cards or chip cards with the respective PIN. If the device 20 detects the fact that the PIN does not correspond to the expected PIN for the respective fax cover sheet 1, the device 20 will refuse to forward the respective fax message. With the aid of reply device 34, this can be revealed to fax machine 21, from which an attempt is being made to transmit the respective fax message.

The prevention of fraud after theft can furthermore be achieved by using unique serial number nodes 4(1), . . . , 4(N), as has been explained above.

If, at a certain instant in time, there are various messages in the memory 32, the forwarding means 33 can compare the fax numbers 7(j) of different fax messages with one another. The forwarding means 33 can assemble on the basis thereof groups of fax messages to be transmitted. Each such group is then assembled on the basis of the destination address, in short on the basis of the geographical location of the destination of the respective fax messages. This can be detected from the numerals in the fax numbers. Thus, the forwarding means 33 can collect, for example, various fax messages which have to be transmitted within a predetermined time to the United States from a particular place in Europe. The forwarding means then have to transmit the fax messages only within a certain time determined by the transmission priorities 8(j). Within the time, they can, however, be transmitted as a group as soon as the forwarding means have occupied a communication link 25 which has to be traversed jointly by all the fax messages within a certain group. The joint transmission of various fax messages in blocks via a single occupied communication link 25 results in a better performance of existing communication links. As a result of providing transmission priorities, the forwarding means can therefore utilize the communication links 25 still more efficiently.

The principle of the present invention is also applicable to systems in which no use is made of paper originals, but in which the originals of a text have been stored in a computer memory and have to be transmitted via a telecommunication network to another fax machine or another computer. In this context, use can be made of a set-up according to FIG. 4, in which the (personal) computer 22 is shown diagrammatically. The computer 22 comprises a processor 42, which can be connected to the device 20 via a communication link 24. The processor 42 in also connected to a keyboard 40 provided with keys 41 and to a display unit 43. The processor 42 is usually provided with a memory (not shown) in which suitable software can be stored. The processor 42 is programmed in such a way that the user can display a fax cover sheet on the display means 43 with the aid of a keyboard 40 and can enter thereon the desired codings 3(i), 7(j), 8(j), 10, 11(1), 11(2), 13, 15, 17. The processor 42 can therefore be provided with software for laying out an electronic cover sheet on which the control information is in the form of the above-mentioned codings. Such an electronic cover sheet can be added to the information which is stored in the memory (not shown) of the processor and which has to be transmitted to a fax machine 26 or a computer 27 via the system shown in FIG. 1.

The user enters a transmission priority code 8(j) on the electronic cover sheet. The transmission priority code 8(j) is then used by the device 20 for making use as efficiently as possible of, in particular, international telecommunication links 25, as explained above.

What is claimed is:

1. A device for receiving and forwarding electronic messages which each comprise at least a section containing coded control information and other information, which control information comprises at least one group of destination address information and which device is provided with:

a memory;

decoding means connected to the memory for receiving the electronic messages and for decoding the coded control information and for storing, for each electronic message, the decoded control information together with the other information in the memory; and forwarding means connected to the memory for reading, for each electronic message, the decoded control information together with the other information out of the memory and for forwarding at least the said other information of the electronic message via a communication link selected on the basis of at least the one group of destination address information, after a time interval to be controlled automatically by the forwarding means, wherein the device is equipped to receive a transmission priority code added to each item of destination address information and, during operation, the forwarding means automatically select a cheaper or more expensive communication link at least on the basis of the transmission priority code from a multiplicity of communication links and determine the instant in time of forwarding the electronic message also in dependence on the transmission priority code, wherein, the instant in time is within a maximum time interval determined by the transmission priority code.

2. A device according to claim 1, wherein the device is further equipped to receive a transmitting client code assigned to a predetermined client and, during operation, the device automatically draws up an itemized invoice for the client associated with the transmitting client code.

3. A device according to claim 2, wherein the device is further equipped to receive the telephone number of a transmitting machine and, during operation, the device checks whether said telephone number corresponds to the transmitting client code and, if this is not the case, does not forward the electronic message received.

4. A device according to claim 3, wherein the device is further equipped to receive a personal identification number and, during operation, the device checks whether the transmitting client code corresponds to the personal identification number and, if this is not the case, does not forward the electronic message received.

5. A device according to claim 2, wherein the device is further equipped to receive a serial number code and, during operation, the device checks whether the electronic message associated with the serial number code can be forwarded and, if this is not the case, blocks the forwarding thereof.

6. A device according to claim 1, wherein the device is further equipped to receive a transmitting client code assigned to a predetermined client and, during operation, the device automatically determines a reply telephone number assigned to the predetermined client on the basis of the transmitting client code for automatically providing reply messages.

7. A device according to claim 6, wherein the device is further equipped to receive the telephone number of a transmitting machine and, during operation, the device checks whether the telephone number corresponds to the transmitting client code and, if this is not the case, does not forward the electronic message received.

8. A device according to claim 7, wherein the device is further equipped to receive a personal identification number and, during operation, the device checks whether the transmitting client code corresponds to the personal identification number and, if this is not the case, does not forward the electronic message received.

9. A device according to claim 6, wherein the device is further equipped to receive a serial number code and, during operation, the device checks whether the electronic message associated with the serial number code can be forwarded and, if this is not the case, blocks the forwarding thereof.

10. A device according to claim 1, wherein, during operation, the forwarding means transmit the electronic message to more than one destination address on the basis of the destination address information.

11. A device according to claim 1, wherein the device is further equipped to receive a transmission quality code and, during operation, the forwarding means forward at least the other information with a quality determined by the transmission quality code.

12. A device according to claim 1, wherein the device is further equipped to receive a way-of-delivery code selected from one of the following options:
 a direct way-of-delivery code which controls the forwarding means so as to forward at least the other information directly to a receiving machine associated with the destination address information;
 a central way-of-delivery code which controls the forwarding means so as to forward at least the other information to a central distributing device for distributing electronic messages to receiving machines disposed in its vicinity, which central distributing device is selected by the forwarding means on the basis of the distance from the address associated with the destination address information;
 a postal way-of-delivery code which controls the forwarding means so as to forward at least the other information, optionally via a central distributing device, to a receiving machine of a post office which is selected by the forwarding means on the basis of the distance from the address associated with the destination address information.

13. A device according to claim 1, wherein the device is further equipped to receive a cover sheet layout code and, during operation, the forwarding means forward at least the other information provided with cover sheet information, the forwarding means determining the contents of the cover sheet information as a function of the cover sheet layout code.

14. A device according to claim 1, wherein the decoding means comprise optical character recognition means.

15. A device according to claim 1, wherein, during operation, the forwarding means arrange various electronic messages in groups selected on the basis of their destination address information and their transmission priority code and forward the groups of electronic messages automatically in the form of linked blocks.

16. A device according to claim 1, wherein, during operation, the forwarding means select the communication link from one of the following possible communication links: a telephone link, an ISDN link, an electronic-mail link and any desired combination thereof.

17. A fax cover sheet for interacting with a device according to claim 1, provided with a group comprising at least one group of electronically recognizable destination address markers and a group of at least one electronically recognizable transmission priority marker, one for each group of destination address markers, each group of destination address markers identifying a destination address and each transmission priority marker identifying a transmission priority to the respective destination address.

18. A fax cover sheet according to claim 17, wherein it is further provided with electronically recognizable transmitting client markers for identifying a transmitting client.

19. A fax cover sheet according to claim 18, wherein it is further provided with an electronically recognizable transmission quality marker for identifying a desired transmission quality.

20. A fax cover sheet according to claim 17, wherein it is further provided with an electronically recognizable serial number code for uniquely identifying the fax cover sheet.

21. A fax cover sheet according to claim 17, wherein it is further provided with an electronically recognizable way-of-delivery marker for identifying a desired way of delivery selected from one of the following options:
 a direct way-of-delivery code for controlling the forwarding means so as to forward the message directly to a receiving machine associated with the destination address information;
 a central way-of-delivery code for controlling the forwarding means so as to forward the message to a central distributing device for distributing electronic messages to receiving machines disposed in its vicinity, which central distributing device is selected by the forwarding means on the basis of the distance from the address associated with the destination address information;
 a postal way-of-delivery code for controlling the forwarding means so as to forward the message, optionally via a central distributing device, to a receiving machine of a post office which is selected by the forwarding means on the basis of the distance from the address associated with the destination address information.

22. A fax cover sheet according to claim 17, wherein it is further provided with an electronically recognizable fax cover sheet layout marker for specifying to the forwarding means whether or not the latter has to assemble cover sheet information.

23. A system comprising: a device according to claim 1 and a computer device provided with input means, display means and a processor which is connected both to the input means and to the display means and can be connected to a communication link for transmitting and receiving data, the processor being provided with means for:
 receiving messages which are fed in via the input means and which comprise at least control information and other information, which control information comprises at least one group of destination address information and further at least one transmission priority code associated with each group of destination address information for specifying the priority with which the message has to be transmitted,
 laying out at least one electronic cover sheet and displaying it on the display means, which at least one electronic cover sheet comprises at least one section of the control information with the at least one transmission priority code, and transmitting the electronic message via the communication link to said device.

24. A system according to claim 23, wherein the means for laying out the electronic cover sheet and displaying it on the display means generate a transmitting client code and an associated serial number code as a control for identifying the sender of the electronic message.

25. A system according to claim 23, wherein the means for laying out the electronic cover sheet and displaying it on the display means generate a transmission quality code for determining the transmission quality of the electronic message.

26. A system according to claim 23, wherein the means for laying out the electronic cover sheet and displaying it on the display means generate a way-of-delivery code for determining the way in which the electronic message has to be delivered a the address corresponding to the destination address information.

27. A system according to claim 23, wherein the means for laying out the electronic cover sheet and displaying it on the display means generate a cover sheet layout code for controlling the layout of the fax cover sheet as delivered at the address corresponding to the destination address information.

28. A method for receiving and forwarding electronic messages which each comprise at least one section containing coded control information and other information, which control information comprises at least one group of destination address information, comprising the following steps:

decoding the coded information and storing, for each electronic message, the decoded control information together with the other information in a memory;

reading, for each electronic message, the decoded control information together with the other information out of the memory and transmitting at least the said other information of the electronic message via a communication link selected on the basis of at least one group of destination address information after a time interval to be controlled automatically, receiving of a transmission priority code added to every item of destination address information and automatically selecting, at least on the basis of the transmission priority code, a cheaper or more expensive communication link from a multiplicity of communication links and determining the instant in time of forwarding the electronic message, the instant in time being within a maximum time interval determined by the transmission priority code.

* * * * *

UNITED STATES PATENT AND TRADEMARK OFFICE
CERTIFICATE OF CORRECTION

PATENT NO. : 6,088,127
DATED : July 11, 2000
INVENTOR(S) : ROB PIETERSE

It is certified that error appears in the above-identified patent and that said Letters Patent is hereby corrected as shown below:

Cover Page, the assignee's name should read as follows: --KONINKLIJKE KPN N.V.--.

Signed and Sealed this

Twenty-second Day of May, 2001

Attest:

NICHOLAS P. GODICI

Attesting Officer    Acting Director of the United States Patent and Trademark Office